Nov. 13, 1945.    E. A. STALKER    2,388,806
AIRCRAFT
Filed Aug. 12, 1940    2 Sheets-Sheet 1

INVENTOR
*Edward A. Stalker*

Nov. 13, 1945.  E. A. STALKER  2,388,806
AIRCRAFT
Filed Aug. 12, 1940  2 Sheets-Sheet 2
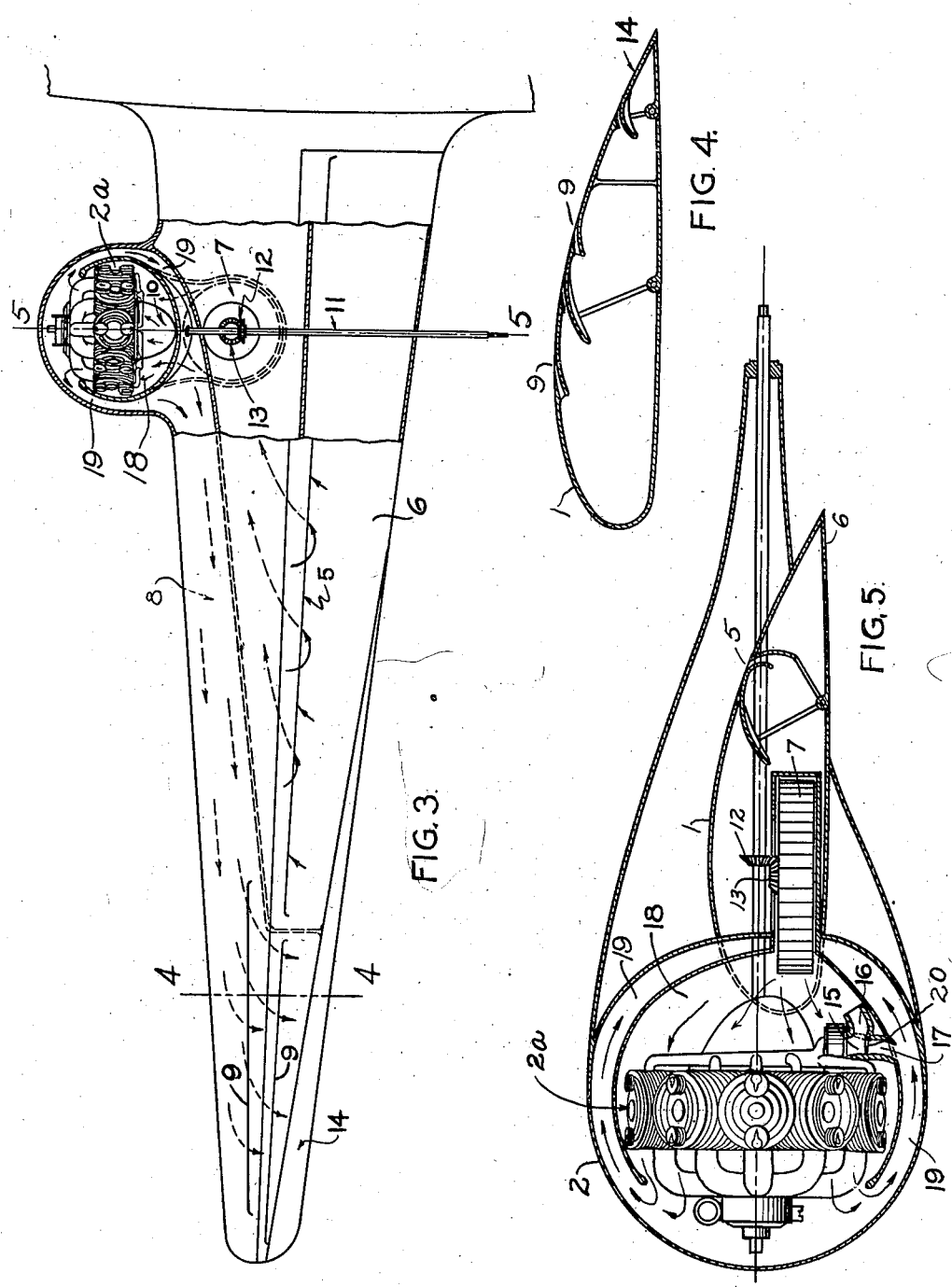
INVENTOR
Edward A. Stalker Patented Nov. 13, 1945

2,388,806

UNITED STATES PATENT OFFICE 2,388,806

AIRCRAFT

Edward A. Stalker, Ann Arbor, Mich.

Application August 12, 1940, Serial No. 352,224

1 Claim. (Cl. 244—40)

My invention relates to aircraft and has for its objects, first to provide a means adaptable to any engine of utilizing the propeller to furnish power while acting as a windmill free of the drag of the engine when it is dead; second to provide means incorporating an efficient arrangement of the engine nacelle relative to the wing; and third to provide an aircraft incorporating novel arrangements of its power plant and wing. Other objects will appear from the specification.

My application Serial No. 304,188 exhibits some cooling arrangements having some resemblance to that of the present application. The present application is different in that it refers to engines within nacelles.

One feature in particular of this invention is a means of using radial engines whose crank shaft is in line with the propeller shaft and which provides for taking power off the propeller generated by it acting as a windmill, while eliminating the need to rotate a dead engine by the propeller. In this way more power is available from the propeller.

It is impracticable in a radial engine to have an auxiliary shaft extending from the propeller shaft rearward past the bank of cylinders to a blower in the rear of the engine—in the wing for instance as in a conventional wing-engine arrangement. This can be done practically with an in-line engine as set forth in my U. S. Patent No. 1,913,644. A bank of radial cylinders, however, would make necessary additional shafts and gears to get from the propeller shaft in front out around the engine to a blower in the rear. The present invention rearranges the engine and propeller in a novel manner.

The invention also sets forth an engine nacelle or body housing an engine which causes the minimum disturbance of the flow about the aircraft. It does this in part because the nose of the nacelle is entirely streamline and free of the openings and gills normally present for cooling the engine and feeding its carburetor.

Figure 1:
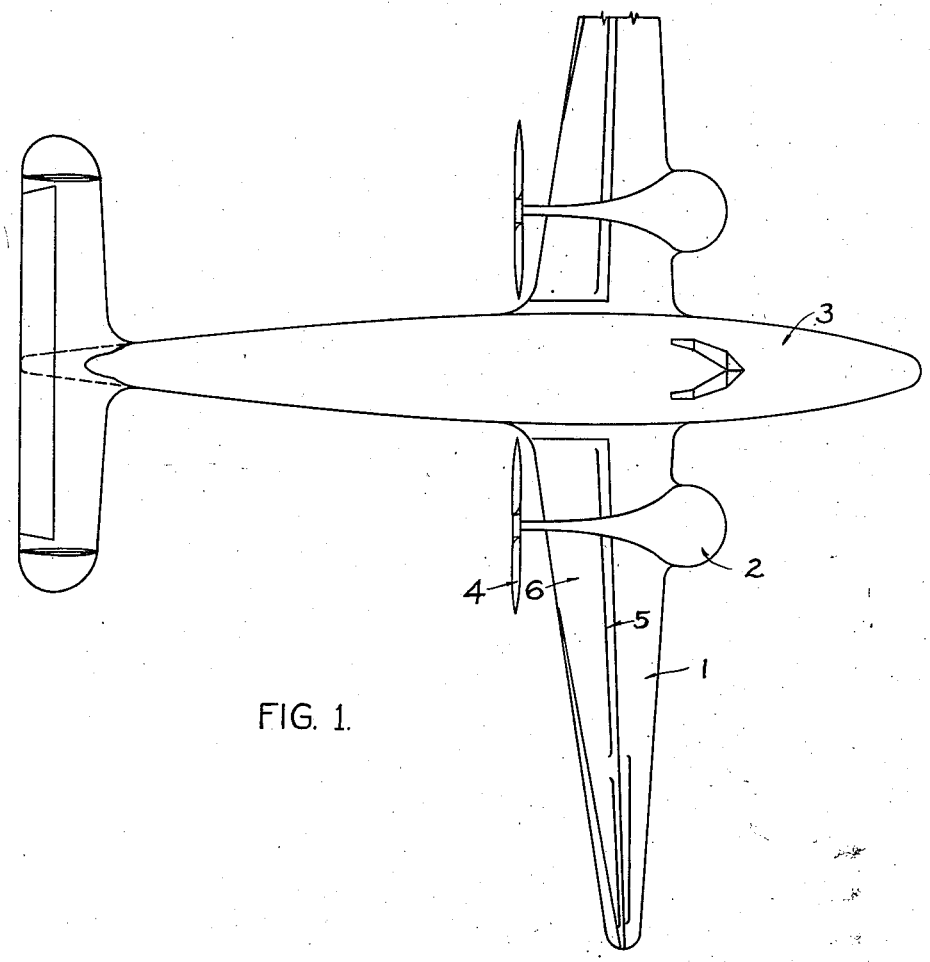
Figure 2:
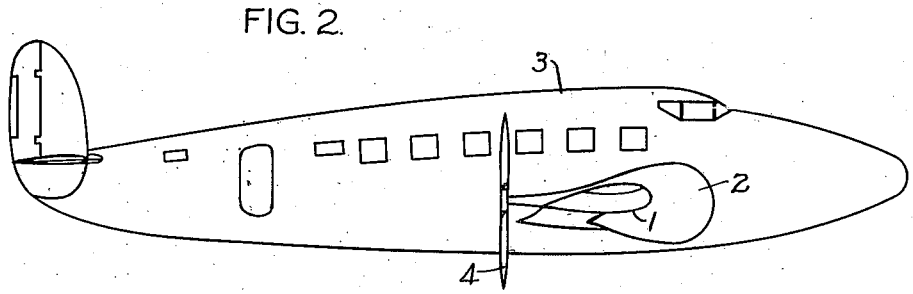

Figures 1 to 5 show the preferred form of the invention wherein the wing is 1, the engine nacelle is 2, the fuselage is 3, and the propeller is 4. The wing has the slot 5 in the flap 6. A blower 7 inducts air through the slot 5 and forces it past the cylinders of the engine 2a, thence back to the wing through the duct 8. It is then discharged from the wing through slots 9 in the wing surface.

The engine is connected to the propeller by means of the overrunning clutch 10 at the nose of the engine and the propeller shaft 11 which carries fixed to it the bevel gear 12 in mesh with the gear 13 on the blower 7.

It will now be clear that the propeller could be operated as a windmill to drive the blower 7 while free of the resistance of the engine because of the overrunning clutch 10.

The wing has the aileron 14 hinged to the flap 6 and its action is improved by the air discharged from slots 9.

Air is supplied for combustion in the engine by the duct 15 which has two branches 16 and 17, one leading to the passage 18 into which the blower 7 discharges and the other to the passage 19 which is annular in shape and conducts the heated air from the engine into the wing passage 8.

A valve 20 is used to select the passage from which air is to be drawn. If there is danger of icing the air is drawn from passage 19, otherwise from passage 18.

In the present-day airplane the engine nacelle takes in air at the nose and discharges just to the rear of the engine through a slot in its wall. There are two major disadvantages to this scheme. The front of the nacelle is blunt and open to the air so that it is not streamline. This causes drag. The drag of the poor streamline nose is made worse by the discharge of the cooling air through the nacelle slot. This air has little velocity and when discharged over the upper surface of the wing it spoils the lift and creates added wing drag.

In this invention the nacelle has a perfect streamline nose giving only a small drag. No air is discharged at low velocity to spoil the lift because the blower replaces the pressure lost in flowing past the cylinders.

It will now be clear that I have provided a novel arrangement of engine, nacelle, propeller and blower which utilizes a radial engine with the minimum of parts and provides a power plant of low external drag.

It will also be clear that it provides a simple means of heating the surface of the wing with air from a radial engine in a wing nacelle.

While I have illustrated a special form of the invention it is to be understood that I do not limit myself to the precise forms disclosed but intend to claim my invention broadly as indicated in the appended claim.

I claim:

In combination in an aircraft, a supporting wing having an intake slot in its surface in communication with its interior, an engine and an engine nacelle to house the engine, said nacelle being substantially closed to the head on influx of the relative wind, a blower operable by said engine and in communication with said intake slot to induct air therethrough, duct means in communication with said blower to pass the inducted air past the engine in said nacelle and back into the wing interior for discharge therefrom, means for supplying combustion air to said engine, and adjustable means for selectively drawing said combustion air either from the air supplied by said blower to said engine, or from the air after passage over said engine.

EDWARD A. STALKER.